US008780077B2

(12) United States Patent
Dai et al.

(10) Patent No.: US 8,780,077 B2
(45) **Date of Patent: *Jul. 15, 2014**

(54) USER INTERFACE FOR HANDWRITING INPUTS

(75) Inventors: Juan Dai, Redmond, WA (US); Yi Zhou, Beijing (CN); Mingqin Li, Beijing (CN); Liang Chen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

This patent is subject to a terminal disclaimer.

(21) Appl. No.: 13/222,483

(22) Filed: Aug. 31, 2011

(65) Prior Publication Data

US 2012/0293423 A1 Nov. 22, 2012

(30) Foreign Application Priority Data

May 20, 2011 (WO) ................ PCT/CN2011/074407

(51) Int. Cl.
*G06F 3/045* (2006.01)

(52) U.S. Cl.
USPC ............................ 345/174; 345/173; 345/179

(58) Field of Classification Search
USPC .................... 345/169–183; 178/18.01–18.07, 178/19.01–19.06, 20.01–20.04
See application file for complete search history.

(56) References Cited

U.S. PATENT DOCUMENTS

2009/0226091 A1 9/2009 Goldsmith et al.
2012/0302291 A1* 11/2012 Mori et al. .................... 455/566

FOREIGN PATENT DOCUMENTS

CN 101004738 A 7/2007
CN 101183284 5/2008
CN 101576783 11/2009
CN 101853088 10/2010

OTHER PUBLICATIONS

Preliminary Report on Patentability in PCT/CN2011/074407, mailed Nov. 28, 2013, 8 pages.
Preliminary Report on Patentability in PCT/CN2011/074387, mailed Nov. 28, 2013, 6 pages.
International Search Report and Written Opinion in PCT/CN2011/074407, mailed Mar. 1, 2012.
International Search Report and Written Opinion in PCT/CN2011/074387, mailed Feb. 23, 2012.

* cited by examiner

*Primary Examiner* — Vijay Shankar
(74) *Attorney, Agent, or Firm* — Tony Azure; Leonard Smith; Micky Minhas

(57) ABSTRACT

A method, medium, device, and user interface are provided for receiving a handwriting input and for presenting prediction candidates based on the handwriting input. A pen down event is detected in a writing panel of a user interface. The writing panel is expanded to overlie function keys and a candidate window of the user interface such that those features are made inaccessible for inadvertent selections thereof. Upon detection of a pen up event the writing panel is decreased in size to again reveal the features. Recognition candidates are identified based on the handwriting input. Prediction candidates are also identified based on a highest ranking recognition candidate and are presented in combination with the highest ranking recognition candidate. Prediction candidates are thereby identifiable with the recognition candidate with which they are associated and selection of a prediction candidate and recognition candidate may be performed in single selection input.

20 Claims, 8 Drawing Sheets

USER INTERFACE FOR HANDWRITING INPUTS

CROSS-REFERENCE TO RELATED APPLICATIONS

This application claims priority to PCT Application No. PCT/CN2011/074407, filed May 20, 2011 the disclosure of which is hereby incorporated herein in its entirety by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter. In brief and at a high level, this disclosure describes, among other things, ways to provide a user interface for receiving handwriting inputs for constructing a text string.

In an embodiment, methods, devices, and user interfaces are provided that include a writing panel and one or more function keys. The writing panel occupies a first area of the user interface. When an input is detected within the writing panel its size is increased to a second area larger than the first area. The second area overlies or is superimposed over the one or more function keys to make them inaccessible during receipt of the handwriting input. Thus, inadvertent or unwanted selections of the one or more function keys during handwriting input are eliminated and a user is provided with an increased area in which to provide handwriting inputs.

In another embodiment, methods, devices, and user interfaces are provided for presenting recognition candidates and prediction candidates for a received handwriting input. Upon receipt of a handwriting input a recognition candidate is determined via a recognition engine. Additionally, a plurality of prediction candidates are determined based on the recognition candidate and using a lexicon of word groups or phrases and/or a word groups or phrases previously used by a user. The recognition candidate is presented in a user interface singularly and with a number of the prediction candidates as combination candidates. The combination candidates include the recognition candidate followed by a prediction candidate. Upon selection of the recognition candidate or one of the combination candidates, a number of second prediction candidates are identified and presented.

DESCRIPTION OF THE DRAWINGS

Illustrative embodiments of the invention are described in detail below with reference to the attached drawing figures, and wherein.

DETAILED DESCRIPTION

Figure 1:
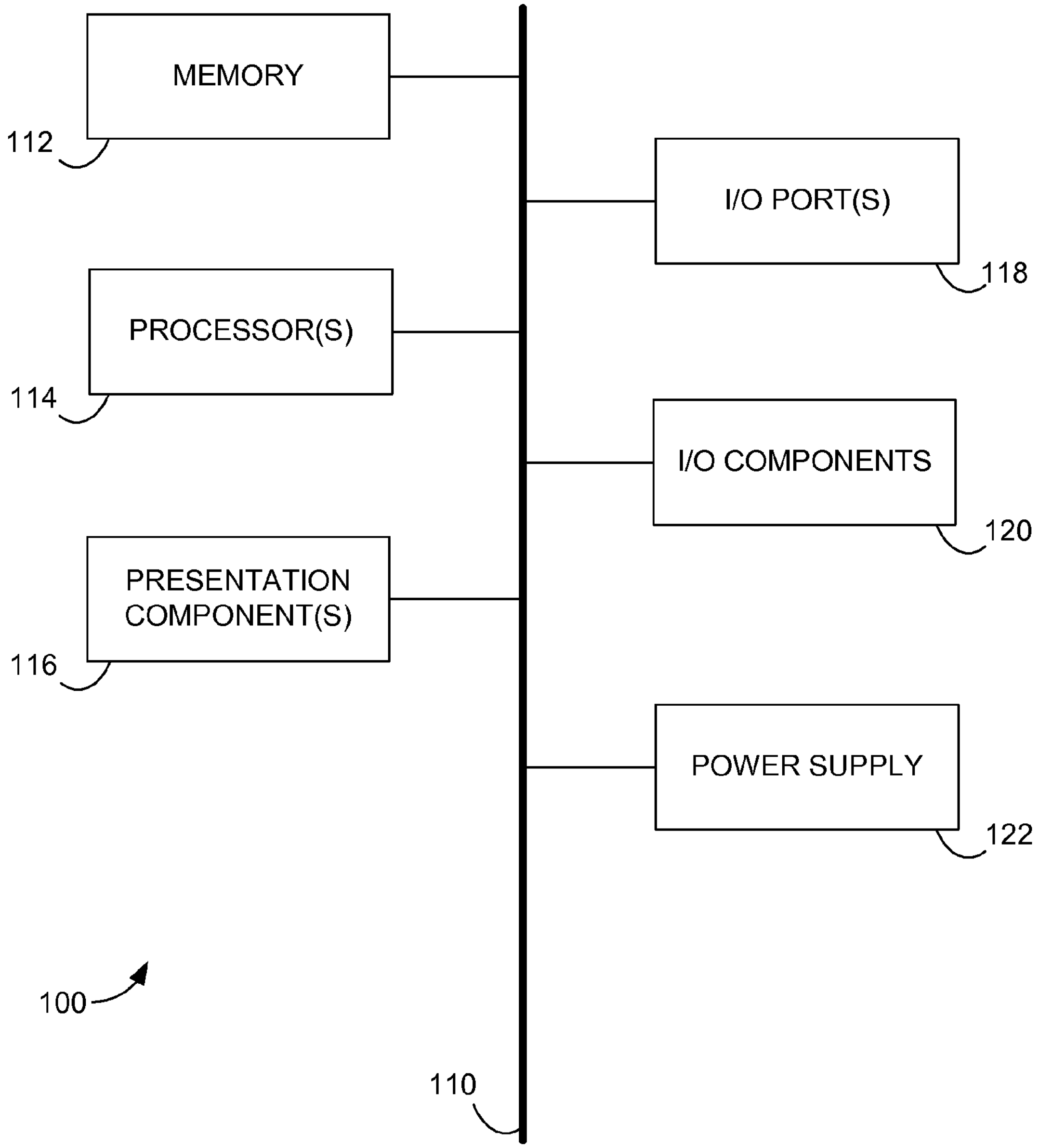
FIG. 1 is a block diagram of an exemplary computing device suitable for use in embodiments of the invention.

The subject matter of select embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include methods, systems, computing devices, computer-readable media, and user interfaces that increase the ease by which a user provides handwriting inputs and constructs text strings therefrom. As described herein, handwriting inputs, also referred to as electronic ink or simply, ink, include any form of handwriting input available. The handwriting inputs include text, letters, words, symbols, drawings, or the like and are provided in any language or form of writing available. Embodiments of the invention are described herein with respect to Asian text or script, however such is not intended to limit embodiments of the invention to any particular form of writing or text.

The handwriting inputs can be provided in any desired manner. The handwriting inputs might be received or provided to a computing device via a touch interface, a touch pad, a touch screen, an electronic pen, a stylus, or any other handwriting input device. For example, in an embodiment, a capacitive touch interface is superimposed over a display device to allow a user to provide handwriting inputs in visual relation to a displayed user interface. The handwriting inputs are provided using a user's finger or via a stylus. In another embodiment, an electronic pen is employed that communicates with a computing device wirelessly or through a wired connection. The pen tracks the writing inputs of the user with respect to a display screen, specially designed paper, or through motion sensor tracking, among other methods.

In an embodiment of the invention, computer-readable storage media having computer-executable instructions embodied thereon that, when executed, perform a method for altering a display state based on an input type are described. A user interface configured to aid a user in constructing a text string based on handwriting inputs is presented. The user interface includes a function key and a writing panel having a first area. An initiation of a handwriting input in the writing panel having the first area is detected. The area of the writing panel is increased to a second area larger than the first area. The writing panel having the second area overlies the function key so as to render the function key inaccessible. The handwriting input is received in the writing panel having the second area.

In another embodiment, a user interface presented by a computing device having a processor, a memory, and a handwriting input device is described. The user interface includes a candidate window that is configured to present one or more of a recognition candidate and a prediction candidate. The recognition candidate is determined by a recognition engine executed by the processor and based on a received handwriting input. The prediction candidate is determined based on the recognition candidate and one or more of an input history and a lexicon of phrases. An edit field that displays a text string that includes one or more of the recognition candidate and the prediction candidate is also included as are function keys configured to execute a respective function when selected. The user interface also includes an input window associated with the handwriting input device and configured to toggle a handwriting input panel for receipt of a handwriting input. The input window has a first area and the handwriting input panel has a second area larger than the first area. The handwriting input panel overlies the candidate window and the function keys.

In another embodiment, a mobile device configured to present a user interface for receiving a handwriting input via a touch input device is described. The mobile device includes a processor, a memory, and a display component with an associated touch input device, the display component being configured to present a user interface. The user interface includes a candidate window that displays recognition candidates that are identified by a recognition engine executed by the processor and based on a handwriting input received via the touch interface. The candidate window also displays a plurality of prediction candidates. The user interface also includes an edit field that displays the first recognition candidate as determined text, one or more function keys configured to cause a respective function or command to be executed, and a dynamic input panel having a first area when the user interface is in a recognition or prediction state and a second area that is larger than the first area when the user interface is in a writing state. The dynamic input panel overlies the candidate window and the one or more function keys when in the writing state and having the second area.

In another embodiment, computer-readable storage media having computer-executable instructions embodied thereon that, when executed, perform a method of presenting prediction candidates based on a recognized handwriting input are provided. A handwriting input is received from a handwriting input device coupled to a computing device having a processor and a memory. A recognition engine is executed to identify a recognition candidate based on the handwriting input. A prediction candidate associated with the recognition candidate is determined. The recognition candidate and the prediction candidate are presented, the recognition candidate being presented singularly and as a combination candidate that includes the recognition candidate followed by the prediction candidate.

In another embodiment, a user interface presented by a computing device having a processor, a memory, and a handwriting input device is described. The user interface includes an input window associated with the handwriting input device and configured to one or more of receive a handwriting input and toggle a handwriting input panel for receipt of a handwriting input. A candidate window that includes a recognition display state and a prediction display state is also included. When in the recognition display state, the candidate window presents one or more recognition candidates and one or more combination candidates that include a first recognition candidate from the one or more recognition candidates followed by a prediction candidate. The prediction candidate is determined based on the first recognition candidate and one or more of a user's input history and a lexicon of phrases. In the prediction display state the candidate window presents one or more second prediction candidates associated with a selected one of the recognition candidates and combination candidates. An edit field that displays a text string that includes one or more of the recognition candidates, the prediction candidates, and second prediction candidates is also included.

In another embodiment, a mobile device configured to present a user interface for presenting recognition and prediction candidates associated with a received handwriting input is disclosed. The mobile device includes a processor, a memory, and a display component with an associated touch interface, the display component being configured to present a user interface. The user interface includes a candidate window that displays recognition candidates that are identified by a recognition engine executed by the processor and based on a handwriting input received via the touch interface. The candidate window also displays a plurality of combination candidates that include a first recognition candidate of the plurality of recognition candidates followed by a respective prediction candidate. One or more of the respective prediction candidates are determined base at least in part on phrases previously input to the mobile device. An edit field that displays the first recognition candidate as determined text is also included.

Referring initially to FIG. 1 in particular, an exemplary operating environment for implementing embodiments of the present invention is shown and designated generally as a computing device 100. The computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a mobile device, mobile phone, smart phone, a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output ports 118, one or more input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; compact disc read-only memory (CD-ROM), digital versatile disks (DVD) or other optical or holographic media; magnetic cassettes, magnetic tape, magnetic disk storage or other magnetic storage devices or any other non-transitory computer-readable medium that can be used to encode desired information and be accessed by computing device 100. Computer-readable media and computer-readable storage media are not inclusive of carrier waves, signals, or other forms of transitory media.

The memory 112 includes computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors that read data from various entities such as the memory 112 or I/O components 120. The presentation component(s) 116 present data indications to a user or other device. Exemplary presentation components include a display device, a speaker, a printing component, a vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
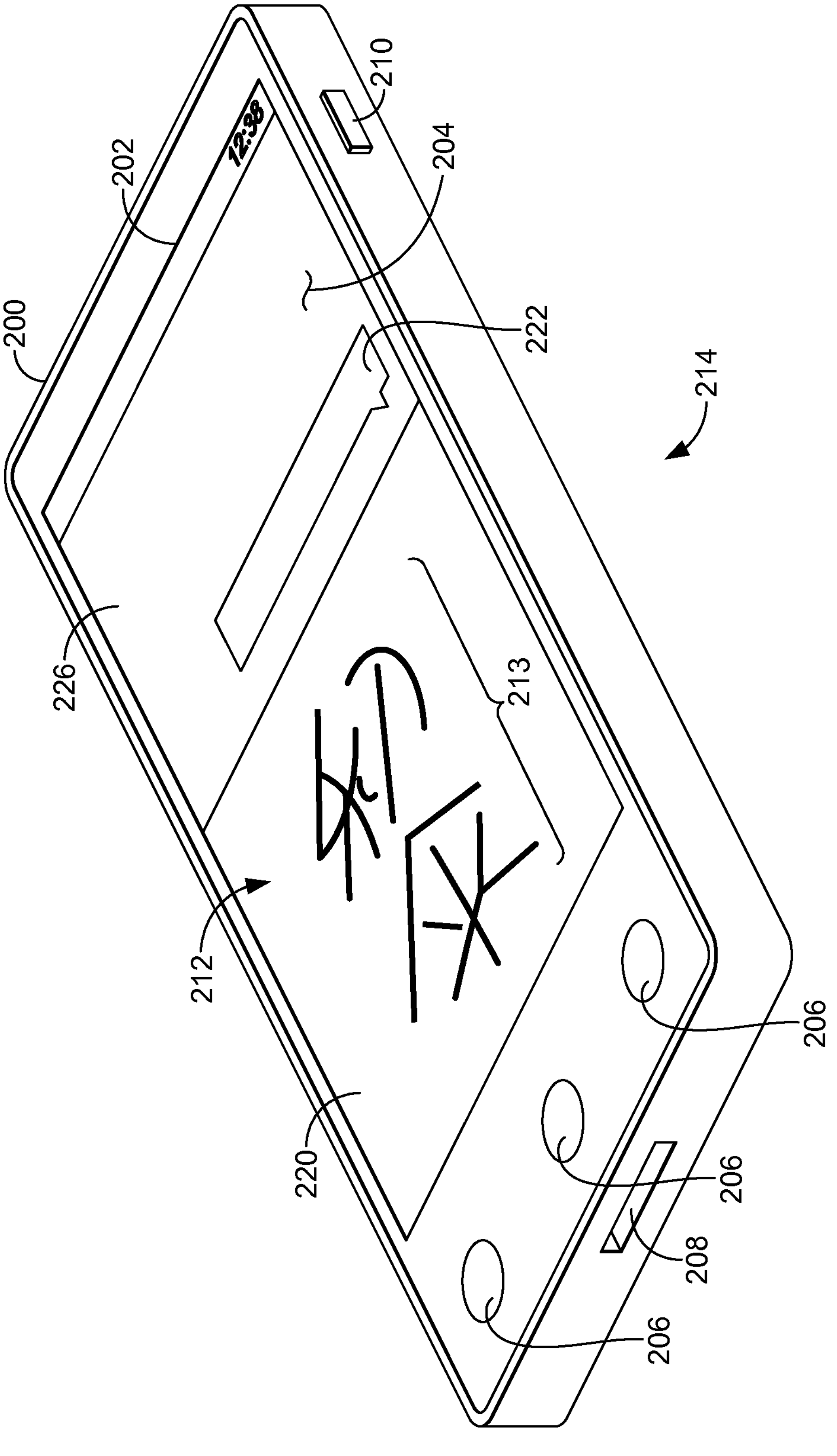
FIG. 2 is a perspective drawing of a mobile device displaying a user interface in accordance with an embodiment of the invention.
Figure 3:
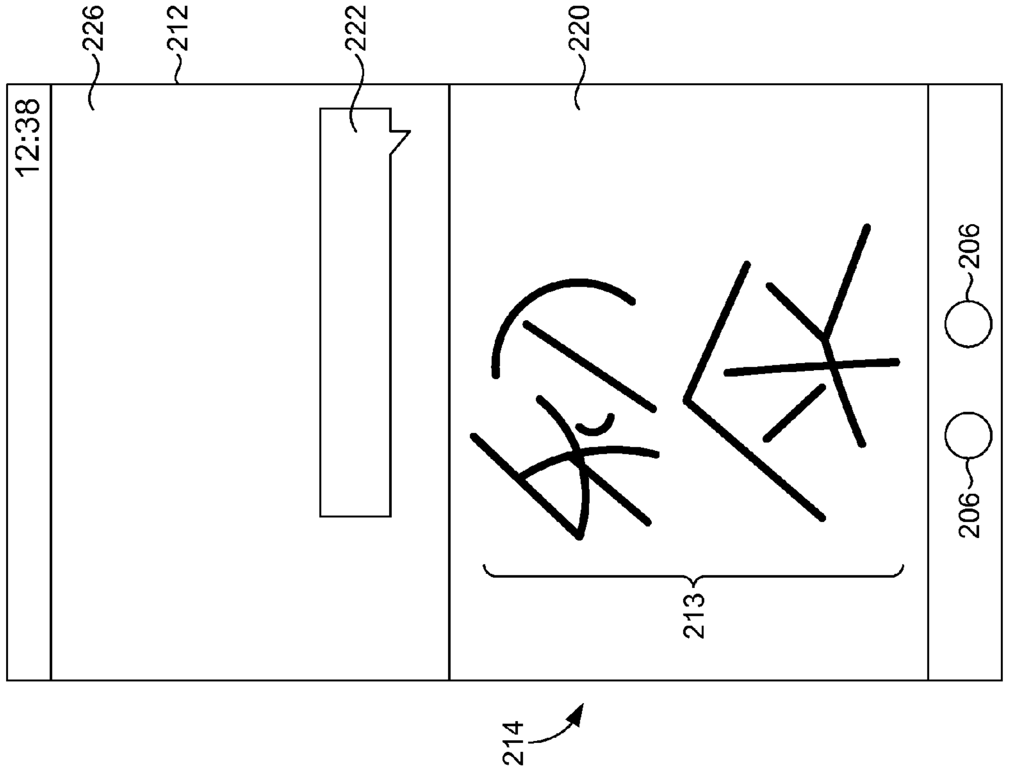
FIG. 3 is drawing depicting a user interface in accordance with an embodiment of the invention.
Figure 5:
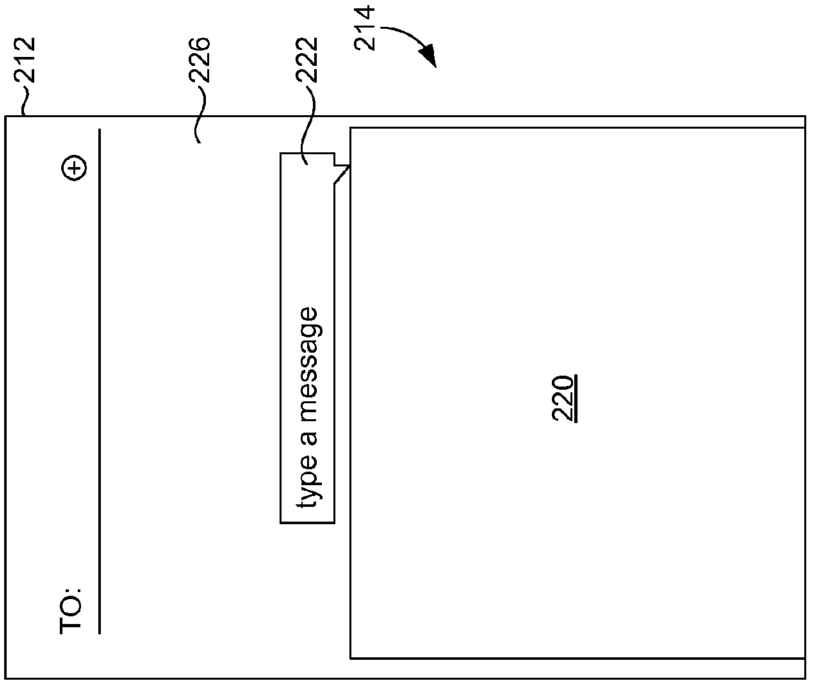
FIG. 5 is drawing depicting a user interface in a writing display state in accordance with an embodiment of the invention.

With reference now to FIG. 2, embodiments of the invention are described with respect a mobile device 200, such as a smart phone. However, such is in no way intended to limit embodiments of the invention to such devices. Embodiments of the invention might utilize any available mobile device, smart phone, personal digital assistant, touch interface, touch screen, computing device, tablet computer, electronic pen, or the like. Further, handwriting inputs are described herein as being provided by a user using a finger to interact with a touch interface, however, the handwriting input can be provided by any desired means including a stylus or electronic pen among others.

The mobile device 200 includes a display device 202, a transparent touch interface 204 overlying the display device 202, a number of command keys 206, a communications port 208, and a hard key 210. The display device 202 and touch interface 204 comprise any available technologies such as, for example and not limitation, color LED (light emitting diode) edge-lit displays and capacitive touch interfaces.

The command keys 206 provide access to functions of the mobile device like causing an application to be executed. The command keys 206 are soft keys that are presented via the display device 202 and inputs thereto are received via the touch interface 204. Or the command keys 206 might be hard keys that are mechanically actuated. The command keys 206 may be assigned a single function or might have variable function assignments based on a state of the mobile device 200. Similarly, the hard key 210 is a mechanically actuated button, switch, or other input device that has a dedicated function.

The communications port 208 provides a wired coupling to a second computing device and/or a power source. The coupling provides data communications between the mobile device 200 and a computing device as is known in the art.

The mobile device 200 also includes a user interface 212, as depicted in FIGS. 2-5. The user interface 212 is configured to receive handwriting inputs, such as a handwriting input 213, from a user and to aid the user in constructing a text string therefrom. The user interface 212 and the text string constructed therefrom are useable by any application executable by the mobile device 200 for which a text input is desired. Such applications include, for example, and not limitation, applications for text messaging or SMS (short message service) messaging, word processing, email, and creation of presentations, spreadsheets, databases or the like.

The user interface 212 includes a number of display states. In an embodiment, the user interface 212 includes a writing display state 214 (FIGS. 2, 3, and 5), a recognition display state 216 (FIGS. 4, 7, and 8), and a prediction display state 218 (FIG. 9). The user interface 212 assumes a given display state based on a state of user inputs. In an embodiment, the recognition display state 216 is a default display state that is taken or assumed by the user interface 212 prior to receiving handwriting inputs. Upon detection of initiation of a handwriting input or a pen down event, the user interface 212 assumes the writing display state 214. The user interface 212 remains in the writing display state 214 until the handwriting input ceases (e.g. a pen up event) or an input is received outside the writing panel 218. In an embodiment, a time out is observed following the pen up event for a predetermined amount of time. In an embodiment, the time out is less than one second or is 0.75 seconds. In another embodiment, an input that causes another user interface to become active such as an input to a command key 206 causes the user interface 212 to leave the writing display state 214 and enter the recognition display state 216.

The user interface 212 remains in the recognition display state 216 until detecting a pen down event or until receiving a selection of a recognition candidate, combination candidate, or prediction candidate as described below. Upon receipt of such a selection, the user interface 212 enters the prediction display state 218. The user interface 212 remains in the prediction display state 218 until detecting an initiation of a handwriting input or receipt of an input that causes another user interface to become active.

In the writing display state 214 (depicted in FIGS. 2, 3, and 5) the user interface 212 includes a first writing panel 220 and may include one or more additional features such as an edit field 222 and a conversation field 226 (e.g. when used with a text messaging application).

The first writing panel 220 provides or designates a region of the user interface 212 in which a handwriting input is to be received. The first writing panel 220 has dimensions comprising a first area. In an embodiment, the first area is configured to provide a maximum area available in the user interface 212 in which handwriting inputs can be received. In another embodiment, the first area is configured to provide a maximized area of the user interface 212 that does not obscure one or more select other displayed components such as the edit field 222 and the conversation field 226.

The edit field 222 displays currently determined and committed text or is blank (FIGS. 2 and 3) or contains a default message (FIGS. 4 and 5) when no determined or committed text has yet been provided. Determined text comprises text that is suggested or that is identified by a recognition engine based on a handwriting input. In an embodiment, determined text must be confirmed by a user before becoming committed text such as by the user selecting the text, providing an enter command, or the like. In an embodiment, determined text is indicated by underlining as depicted at 228 in FIGS. 7 and 8 or by any other desired means. Committed text is text that has been confirmed or affirmatively selected by the user, as depicted at 230 in FIG. 9.

Figure 4:
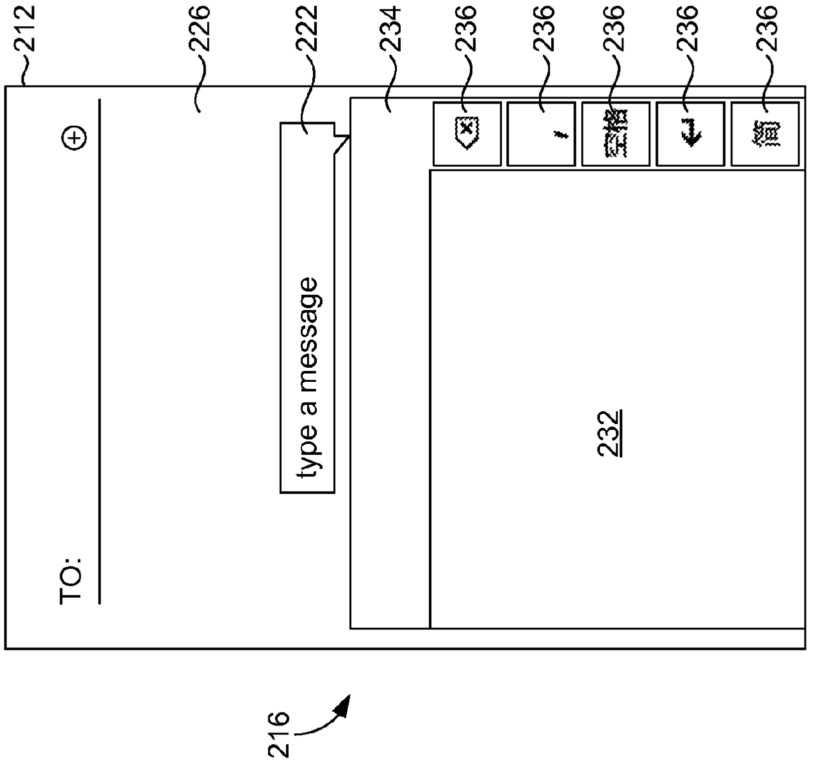
FIG. 4 is drawing depicting a user interface in a recognition display state accordance with an embodiment of the invention.
Figure 7:
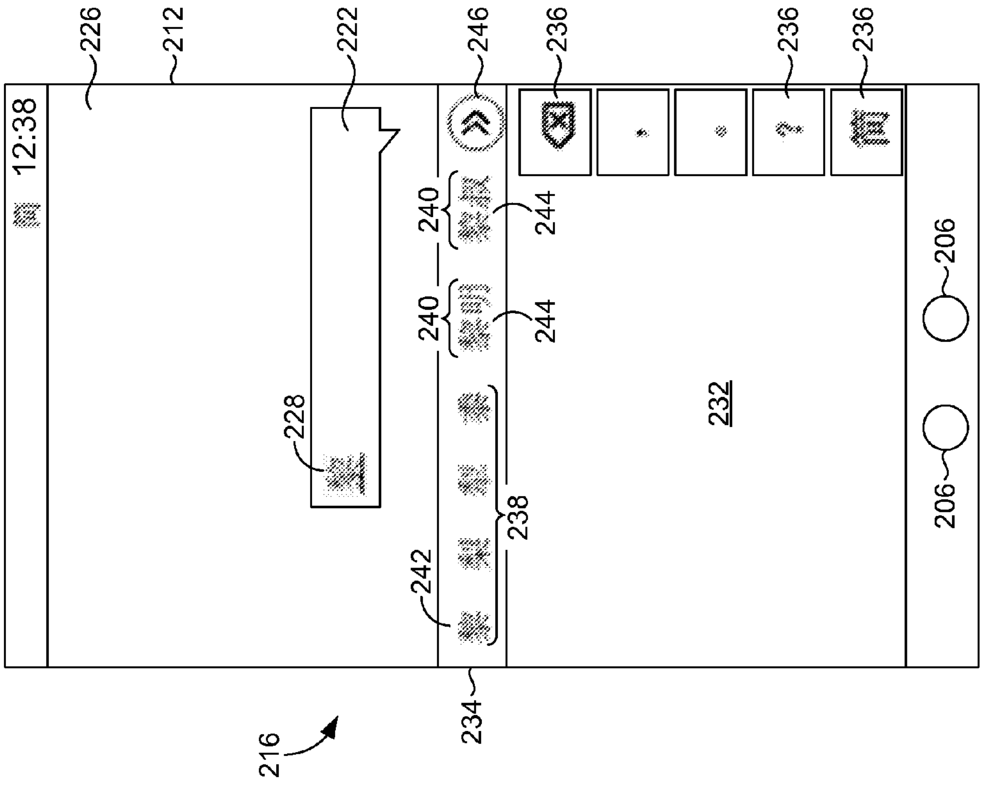
FIG. 7 is drawing depicting a user interface in a recognition state and displaying recognition and combination candidates in accordance with an embodiment of the invention.
Figure 8:
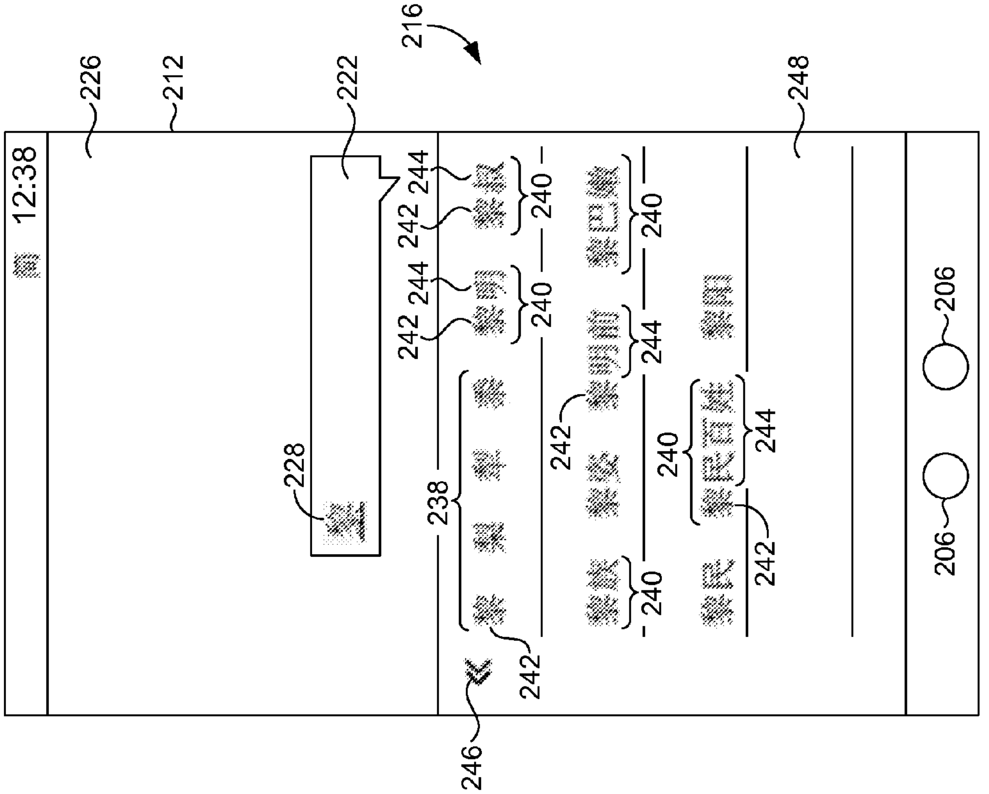
FIG. 8 is drawing depicting a user interface in a recognition display state displaying an expanded candidate window in accordance with an embodiment of the invention.
Figure 9:
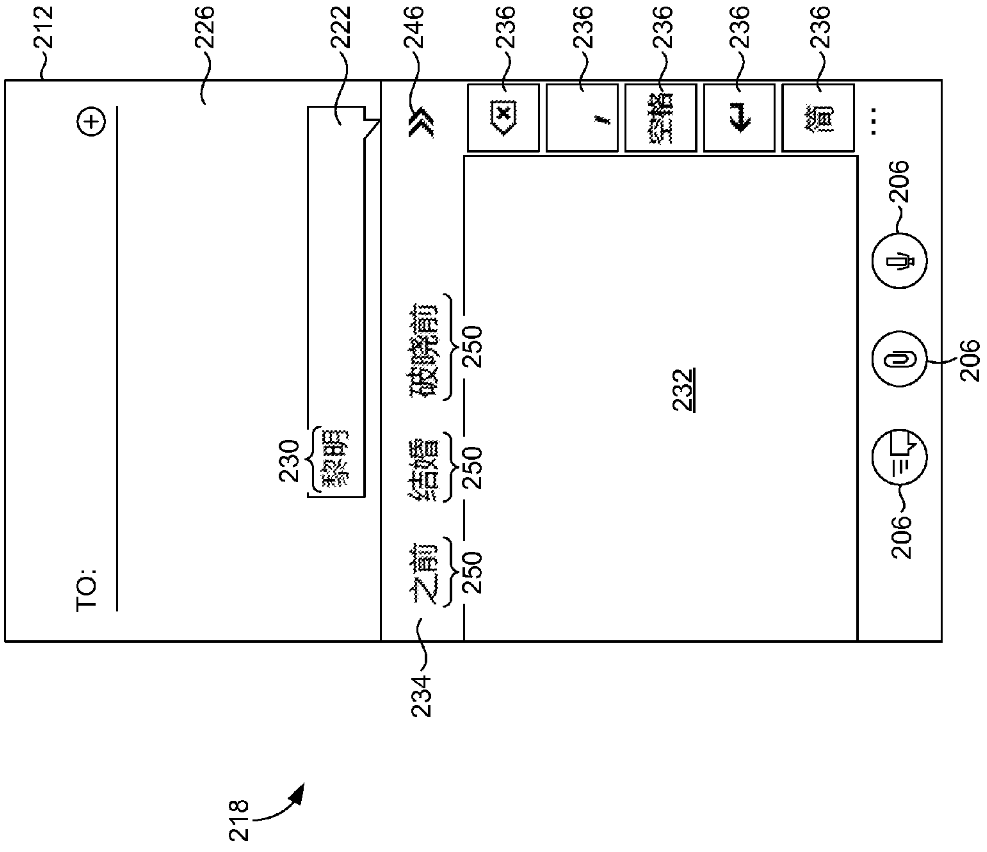
FIG. 9 is drawing depicting a user interface in a prediction display state accordance with an embodiment of the invention.

As depicted in FIGS. 4, 7, and 8, in the recognition display state 216 the user interface 212 includes the edit field 222, the conversation field 236, a second writing panel 232, a candidate window 234, and one or more function keys 236. The second writing panel 232 comprises a region of the user interface 212 having a second area that is smaller than the first area of the first writing panel 220. The second writing panel 232 does not overlie other components of the user interface 212 and is configured to receive or detect a pen down event that toggles the user interface 212 to assume the writing display state 214, as described above.

The candidate window 234 may be blank or empty prior to receiving a handwriting input. Upon receiving a handwriting input, the candidate window 234 displays one or more recognition candidates 238 and one or more combination candidates 240. The candidate window 234 displays any number of recognition candidates 238 and combination candidates 240 as space allows. In an embodiment, the candidate window 234 displays four recognition candidates 238. In another embodiment, a toggle 246 is provided that when selected causes an expanded-candidate-window 248 to be displayed, as depicted in FIG. 8. The expanded-candidate window 248 includes additional space in the user interface in which to display a greater number of recognition candidates 238, combination candidates 240, and prediction candidates 244, as described below.

A recognition candidate 238 comprises a word, letter, symbol, script, or other text that is identified by a recognition engine based on a handwriting input. The recognition engine uses any available algorithms and data stores for correlating a handwriting input to a known text or recognition candidate 238. The recognition engine may rank a number of potential recognition candidates 238 based on a correlation value calculated between the handwriting input and the recognition candidate 238. In an embodiment, the recognition engine also ranks recognition candidates 238 based on a user's input history, frequency of use of the recognition candidate 238 by the user or by a population generally, or any other data for the recognition candidate 238.

In an embodiment, the user's input history is tracked by the recognition engine and/or one or more other components. The user's input history includes only inputs to the user interface 212 or may include inputs made across one or more additional user interfaces or applications on the mobile device 200. The user's input history can be stored in a memory in the mobile device 200 or remotely in a separate storage unit.

One or more of the ranked recognition candidates 238 are displayed in the candidate window 234 in order according to the ranking. In an embodiment, the recognition engine is executed by the mobile device 200 or by a remote computing device, such as the computing device 100.

The combination candidates 240 comprise a first recognition candidate 242 of the one or more recognition candidates 238 followed by a prediction candidate 244. Prediction candidates 244 comprise text identified by the recognition engine as being associated with the first recognition candidate 242. The association is based on one or more of a user's input history, a lexicon or database of word groupings, phrases, and the like, or a dictionary, among other references. In an embodiment, the user's input history includes a measure of a frequency with which the user inputs or selects a word grouping or phrase. The user's input history may also include a measure of a time the user last used a word grouping or phrase, e.g. how long ago the user last used a phrase.

In an embodiment, the first recognition candidate 242 is the highest ranked recognition candidate 238 identified by the recognition engine. As such, the recognition engine identifies prediction candidates 244 based on the first recognition candidate 242. The prediction candidates 244 are each presented following the first recognition candidate 242 to provide an indication of the recognition candidate 238 based upon which they were identified and to provide a selectable combination candidate 240. Additionally, in an embodiment, the prediction candidates 244 and the combination candidates 240 are ranked by the recognition engine based on one or more of a user's input history, a lexicon or database of word groupings, phrases, and the like, or a dictionary, among other references.

Thus, a user can select both the first recognition candidate 242 and a prediction candidate 244 with a single selection by selection the appropriate combination candidate 240. The selection of the combination candidate may also be more intuitive and faster than other methods in which multiple selections are required.

The function keys 236 are selectable regions of the user interface 212 that provide access to functions like carriage return, backspacing, and deleting text, or provide punctuation marks, or toggle the user interface 212 to provide alternate input methods like a virtual keyboard, among a variety of other options.

Referring now to FIG. 9, the user interface 212 is depicted in the prediction display state 218. The prediction display state 218 includes features similar to those of the recognition display state 216 which are not described again here. However, in the prediction display state 218, the candidate window 234 does not include recognition candidates 238 or combination candidates 240. The candidate window 234 includes only prediction candidates 250 that are not presented following an associated recognition candidate 238. The prediction candidates 250 comprise text identified by the recognition engine as being associated with the committed text 230 in the edit field 222. The association is based on one or more of a user's input history, a lexicon or database of word groupings, phrases, and the like, or a dictionary, among other references. In contrast, the prediction candidates 244 are identified based on the first recognition candidate 242 or the determined text 228.

Figure 6:
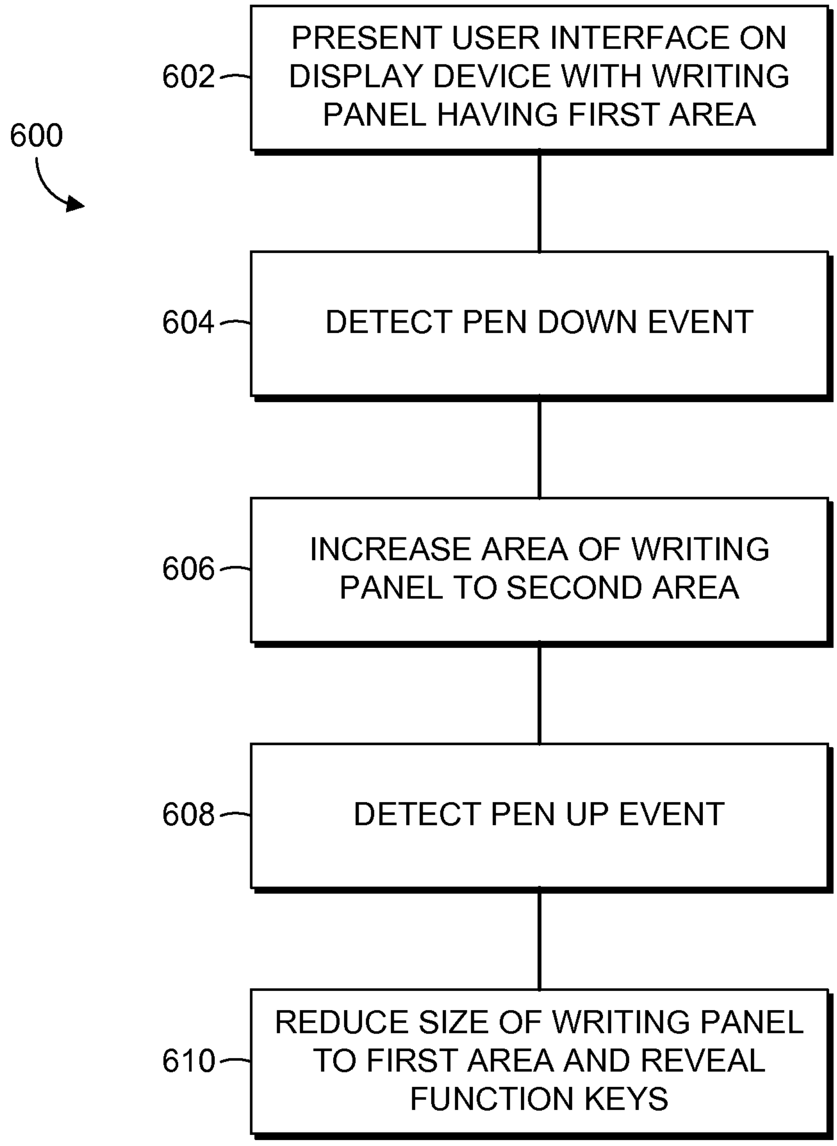
FIG. 6 is flow diagram depicting a method for altering a display state based on an input type in accordance with an embodiment of the invention.

Referring now to FIG. 6, a method 600 for altering a display state based on an input type is described in accordance with an embodiment of the invention. At a step 602, a user interface, such as the user interface 212, is presented on a display device with an associated touch interface. As described above, the user interface may include function keys, a candidate window, and a writing panel that has a first area. A pen down event or an initiation of a handwriting input is detected, at a step 604 and the user interface assumes a writing display state. In an embodiment, the pen down event is detected by the touch interface within a region associated with the writing panel. The area of the writing panel is increased to a second area that is larger than the first area, at a step 606.

By increasing the area or size of the writing panel to the second area the writing panel is expanded. The expanded writing panel provides additional space in which a user may provide the handwriting input. Providing such additional space may be beneficial in mobile devices that have relatively small display regions or touch interfaces that may be difficult for the user to write in, especially when the user provides the handwriting input using a finger.

Additionally, the expanded writing panel extends over or is superimposed over one or more of the function keys, and the candidate window, among other features of the user interface. As such, those features are not visible on the display and are rendered inaccessible while the writing panel has the second area. Thus, a user is not able to inadvertently interact with those features while attempting to provide a handwriting input. For example, a user cannot accidently select a function key when writing a letter or word on touch interface in the expanded writing panel. If the writing panel was not expanded to overlie the function keys a user could inadvertently extend a stroke of the handwriting input outside of the writing panel and contact a function key thereby, inadvertently causing a function assigned to that key to be performed.

At a step 608, a pen up event or cessation of the handwriting input is detected. The writing panel is reduced in size back to the first area to again reveal the function keys, candidate window, and any other hidden features, and a recognition display state is assumed by the user interface, at a step 610. In an embodiment, a time out or delay is observed for a predetermined period of time between the pen up event and assuming the recognition display state.

Figure 10:
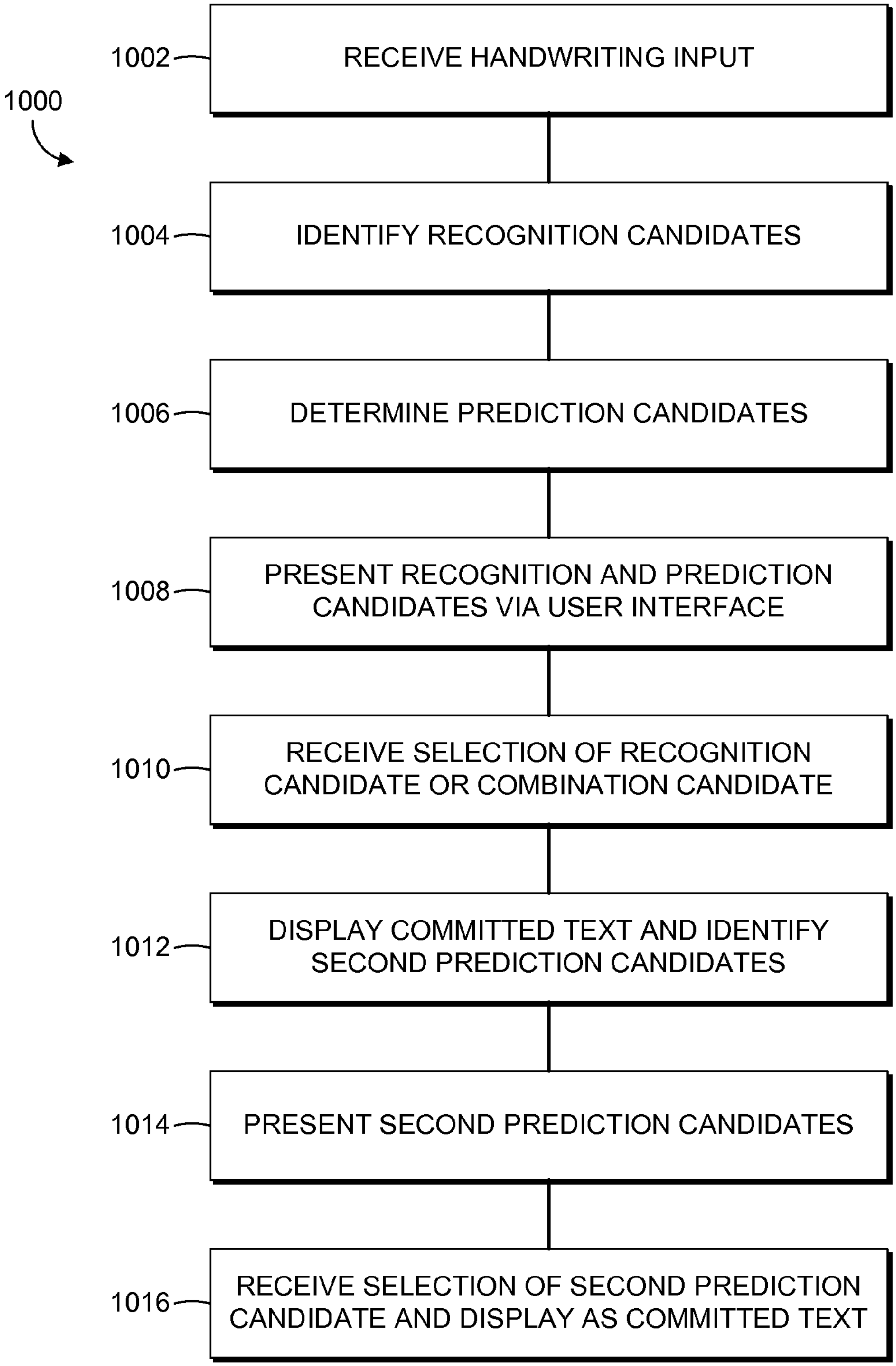
FIG. 10 is flow diagram depicting a method for presenting prediction candidates based on recognized handwriting input in accordance with an embodiment of the invention.

With reference now to FIG. 10, a method 1000 for presenting prediction candidates based on recognized handwriting input is described in accordance with an embodiment of the invention. At a step 1002 a handwriting input is received at a user interface. In an embodiment, the handwriting input is received at a mobile device via a touch interface. A recognition engine is executed to identify one or more recognition candidates based on the handwriting input, at a step 1004. The recognition engine employs any available algorithms and data stores to identify and rank a number of recognition candidates that correlate to the handwriting input.

At a step 1006, a number of prediction candidates are determined by the recognition engine. In an embodiment, the prediction candidates are identified by an engine or component separate from the recognition engine. In another embodiment, the recognition candidates are ranked based on a correlation value between the handwriting input and the recognition candidate. And the prediction candidates are determined based on the highest ranking recognition candidate. The prediction candidates are determined based on an available lexicon and may utilize a user's input history that includes measures of frequency of use of input text and of an amount of time since an input text was last used.

At a step 1008, the recognition candidates and prediction candidates are presented via the user interface in a recognition display state. A number of the recognition candidates are presented first in a listing in order of their determined rank. A number of prediction candidates are presented in a ranked order next in the list; each of the prediction candidates is preceded by the first recognition candidate to indicate their association therewith and to provide ease of selection by a user. As such, a user may select a desired prediction candidate along with the associated recognition candidate with only a single selection input to the recognition candidate-prediction candidate pair (e.g. a combination candidate). In an embodiment, the recognition candidates and prediction candidates are presented in a candidate window in the user interface. Additionally, in an embodiment, the first recognition candidate is presented in an edit field as determined text and is underlined or otherwise indicated to comprise determined text.

A selection of a recognition candidate or a combination candidate is received at a step 1010. The selected recognition candidate or combination candidate is then displayed in the edit field as committed text and a number of second prediction candidates are identified based on the selection candidate(s), at a step 1012.

The second prediction candidates are presented via the user interface in a prediction display state, at a step 1014. The second prediction candidates are not displayed with a recognition candidate as a prefix. Also, the second prediction candidates may be identified based on a user's input history, a lexicon of words and phrases, or any other reference. At a step 1016, a selection of a second prediction candidate is received and the second prediction candidate is appended to the end of a text string in the edit field as committed text. The method 1000 then returns to step 1012.

In an embodiment, at the step 1010 a selection of a second recognition candidate other than the first recognition candidate is received. The second recognition candidate is displayed in the edit field as committed text and a number of second prediction candidates are identified based on the second recognition candidate for presentation by the user interface in the prediction display state.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A user interface presented by a computing device having a processor, a memory, and a handwriting input device, the user interface comprising:

an input window associated with the handwriting input device and configured to one or more of receive a handwriting input and toggle a handwriting input panel for receipt of a handwriting input;

a candidate window that includes a recognition display state and a prediction display state, the candidate window in the recognition display state presenting one or more recognition candidates and one or more combination candidates that include a first recognition candidate from the one or more recognition candidates followed by a prediction candidate, the prediction candidate being determined based on the first recognition candidate and one or more of a user's input history and a lexicon of phrases, and the candidate window in the prediction display state presenting one or more second prediction candidates associated with a selected one of the recognition candidates and combination candidates; and an edit field that displays a text string that includes one or more of the recognition candidates, the prediction candidates, and second prediction candidates.

2. The user interface of claim 1, wherein the recognition display state is presented after receipt of the handwriting input and prior to receipt of a selection of the selected one of the recognition candidates and combination candidates and the prediction display state is presented after receipt of the selection.

3. The user interface of claim 2, wherein when in the recognition display state the edit field displays the first recognition candidate as determined text.

4. The user interface of claim 2, wherein when in the prediction display state the edit field displays the text string as committed text.

5. The user interface of claim 1, further comprising:

an expanded-candidate-window toggle that when selected toggles a presentation of an expanded candidate window that is able to present the one or more recognition candidates, the one or more combination candidates, and one or more additional combination candidates that are not presented in the candidate window.

6. The user interface of claim 1, wherein the one or more recognition candidates are presented in a ranked order based on a correlation between the handwriting input and the recognition candidate.

7. The user interface of claim 1, wherein the one or more combination candidates are presented in a ranked order based at least in part on a user's input history.

8. The user interface of claim 7, wherein the input history includes a measure of a frequency of usage of a combination candidate and a measure of a length of time since a last usage of the combination candidate.

9. A mobile device configured to present a user interface for presenting recognition and prediction candidates associated with a received handwriting input, the mobile device comprising:

a processor;

a memory; and a display component with an associated touch interface, the display component being configured to present a user interface that includes a candidate window, the candidate window displaying a plurality of recognition candidates that are identified by a recognition engine executed by the processor and based on a handwriting input received via the touch interface, the candidate window also displaying a plurality of combination candidates that include a first recognition candidate of the plurality of recognition candidates followed by a respective prediction candidate, one or more of the respective prediction candidates being determined base at least in part on phrases previously input to the mobile device, and an edit field that displays the first recognition candidate as determined text.

10. The mobile device of claim 9, wherein the plurality of recognition candidates are presented by the display component in the candidate window in a ranked order based on a correlation value determined by the recognition engine between the handwriting input and the recognition candidate.

11. The mobile device of claim 9, wherein the plurality of combination candidates are presented by the display component in the candidate window in a ranked order base at least in part on a frequency of use and a measure of a length of time since a last use of the combination candidates.

12. The mobile device of claim 9, wherein when a selection of a second recognition candidate of the plurality of recognition candidates or a selection of a first combination candidate of the plurality of combination candidates is received via the touch interface the candidate window displays one or more second prediction candidates that are determined to be associated with the second recognition candidate or the first combination candidate based at least in part on phrases previously input to the mobile device.

13. The mobile device of claim 12, wherein the edit field displays the second recognition candidate or the first combination candidate as committed text.

14. One or more computer-readable storage media having computer-executable instructions embodied thereon that, when executed, perform a method of presenting prediction candidates based on a recognized handwriting input, the method comprising:

receiving a handwriting input from a handwriting input device coupled to a computing device having a processor and a memory;

executing, by the computing device, a recognition engine to identify a recognition candidate based on the handwriting input;

determining a prediction candidate associated with the recognition candidate; and presenting the recognition candidate and the prediction candidate, the recognition candidate being presented singularly and as a combination candidate that includes the recognition candidate followed by the prediction candidate.

15. The computer-readable storage media of claim 14, wherein the method further comprises:

receiving a selection of one of the recognition candidate or the combination candidate;

displaying the one of the recognition candidate or the combination candidate in an edit field as committed text;

identifying a second prediction candidate that is associated with the one of the recognition candidate or the combination candidate; and presenting the second prediction candidate.

16. The computer-readable storage media of claim 15, wherein the method further comprises:

receiving a selection of the second prediction candidate;

appending the second prediction candidate to a text string that includes the one of the recognition candidate or the combination candidate; and displaying the text string with the second prediction candidate in the edit field.

17. The computer-readable storage media of claim 14, wherein the prediction candidate is a history-based-prediction candidate associated with the recognition candidate based on a previous input.

18. The computer-readable storage media of claim 14, wherein the prediction candidate is a next-word prediction that is determined based on a lexicon of known phrases and word groupings.

19. The computer-readable storage media of claim 14, wherein the handwriting input device is a touch interface and the computing device is a mobile device.

20. The computer-readable storage media of claim 14, wherein the prediction candidate includes more than one words, phrases, or symbols.

* * * * *